(12) United States Patent
Holleczek et al.

(10) Patent No.: US 11,333,880 B2
(45) Date of Patent: May 17, 2022

(54) COAXIAL MACRO SCANNER SYSTEM

(71) Applicant: Robert Bosch GmbH, Stuttgart (DE)

(72) Inventors: Annemarie Holleczek, Stuttgart (DE); Tobias Peterseim, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 364 days.

(21) Appl. No.: 16/712,363

(22) Filed: Dec. 12, 2019

(65) Prior Publication Data
US 2020/0201031 A1     Jun. 25, 2020

(30) Foreign Application Priority Data

Dec. 20, 2018  (DE) .......................... 102018222426.9

(51) Int. Cl.
| | |
|---|---|
| *G02B 26/10* | (2006.01) |
| *G01S 17/00* | (2020.01) |
| *G02B 26/12* | (2006.01) |
| *G01S 7/481* | (2006.01) |

(52) U.S. Cl.
CPC .......... *G02B 26/105* (2013.01); *G01S 17/003* (2013.01); *G02B 26/12* (2013.01); *G01S 7/4812* (2013.01); *G01S 7/4817* (2013.01)

(58) Field of Classification Search
USPC ........ 359/850, 851, 854, 855, 857, 862, 865
See application file for complete search history.

(56) References Cited

U.S. PATENT DOCUMENTS

| | | | | |
|---|---|---|---|---|
| 5,337,189 A | * | 8/1994 | Krawczyk | G01S 7/4812 |
| | | | | 356/28.5 |
| 5,357,377 A | * | 10/1994 | Payne, Jr. | A45D 42/18 |
| | | | | 16/225 |
| 2006/0181756 A1 | * | 8/2006 | Yamazaki | G02B 26/0833 |
| | | | | 359/224.1 |
| 2008/0226034 A1 | * | 9/2008 | Weir | A61B 1/045 |
| | | | | 378/145 |

(Continued)

FOREIGN PATENT DOCUMENTS

DE      102010047984 A1     4/2012

*Primary Examiner* — Jennifer D. Carruth
(74) *Attorney, Agent, or Firm* — Norton Rose Fulbright US LLP; Gerard Messina

(57) ABSTRACT

A coaxial-macro-scanner-system, including a light-source, a light-detector, and a rotatable-mirror-system to optically isolate an optical-path between the light-source and light-detector, the rotatable-mirror-system emitting a transmitting-light-beam, generated by the light-source, with a first-mirror in a predefined-plane into an environment, and to receive a receiving-light-beam, representing components of the transmitting-light-beam reflected/dispersed by the environment, with a second-mirror in the same-plane and to reflect it onto the light-detector, both the first-mirror, the second-mirror and an axis of rotation about which the second-mirror is rotated being aligned at a right-angle to the predefined-plane, the first-mirror being aligned at a right-angle to the predefined-plane and being in a region of the rotation-axis of the second-mirror so that the first-mirror and the second-mirror rotate about the common-rotation-axis, and an angle under which the first-mirror and the second- (Continued)

mirror are disposed relative to each other about the common-rotation-axis corresponding to an angle of more than 0°.

15 Claims, 2 Drawing Sheets

(56) References Cited

U.S. PATENT DOCUMENTS

| | | | |
|---|---|---|---|
| 2012/0218612 A1* | 8/2012 | Chang | H01L 41/0933 359/199.4 |
| 2015/0268331 A1 | 9/2015 | Koehler et al. | |
| 2017/0108693 A1* | 4/2017 | Straub | G02B 26/085 |
| 2020/0103506 A1* | 4/2020 | Kamil | G01S 7/4815 |

* cited by examiner

COAXIAL MACRO SCANNER SYSTEM

RELATED APPLICATION INFORMATION

The present application claims priority to and the benefit of German patent application no. DE 10 2018 222 426.9, which was filed in Germany on Dec. 20, 2018, the disclosure of which is incorporated herein by reference.

FIELD OF THE INVENTION

The present invention relates to a coaxial macro scanner system, and more specifically to a coaxial LIDAR macro scanner system for scanning an environment of the coaxial macro scanner system.

BACKGROUND INFORMATION

From the related art, optical scanning systems are known, which are set up to use a rotatable mirror system in order to deflect laser light or laser pulses into an environment of the optical scanning system to be measured, using the mirror system, and to receive components of the radiated laser light, reflected or dispersed by the environment, and to deflect the light onto a light detector of the optical scanning system. Measuring the light propagation time between a transmission and a receiving instant of the laser light makes it possible to determine a distance traveled by the laser light. Objects in the environment of the optical scanning system are ascertainable with the aid of a plurality of successive measurements using different horizontal and/or vertical scanning angles for the emitted and the received laser light. Modern arrangements (apparatuses) of transportation use such optical scanning systems, which are also known as LIDAR sensors, for the purpose of detecting an environment, among other things.

Patent document US20150268331 A1 discusses a coaxial optoelectronic detection device and more specifically a laser scanner for a motor vehicle including an evaluation unit. The evaluation unit is configured to compare a level of a received signal for each scanning angle of the detection device with a detection threshold and to detect a target object as a function of this comparison. In one described specific embodiment, the optoelectronic detection device includes a single rotating deflection mirror. A light source and a light detector are situated one behind the other on an identical side inside the optoelectronic detection device, so that a light beam emitted by the light source into an environment is in turn deflected again to the light detector via the same mirror.

Patent document DE102010047984 A1 discusses a biaxial LIDAR macro scanner system, which has a mirror system provided with a transmission and a receiving mirror, the transmission and the receiving mirrors being situated on top of each other on a common axis of rotation.

In addition, coaxial macro scanner systems are believed to be in the related art which realize an isolation of a transmitting light beam and a receiving light beam with the aid of a perforated mirror. A polygon mirror is used to deflect the transmitting light beam conducted through the hole of the perforated mirror and to deflect the receiving light beam.

SUMMARY OF THE INVENTION

The present invention provides a coaxial macro scanner system, which is configured to ensure a paraxiality of the macro scanner system in order to minimize imaging errors and to ensure a minimization of optical crosstalk between a light source and a light detector of the macro scanner system. A macro scanner system may be understood as a scanner system that has a macroscopic deflection unit. In this context, the term 'coaxial' refers to an emission of a transmitting light beam (e.g., in the form of a spot beam or what is known as a flash line or a line flash) into an environment of the coaxial macro scanner system to be scanned, and the receiving of a receiving light beam, resulting from the transmitting light beam, from the environment via an identical optical path.

The coaxial macro scanner system according to the present invention includes a light source, a light detector and a rotatable mirror system, the latter being used, among other things, for the optical isolation of an optical path between the light source and the light detector. For example, the light source can be a laser source of a LIDAR system, known from the related art, for detecting an environment of an apparatus of transportation. Accordingly, the light detector may be a light detector which is adapted to this laser source. The rotatable mirror system is configured to emit a transmitting light beam, generated by the light source, with the aid of a first mirror in a predefined plane into an environment, and to receive a receiving light beam, which represents components of the transmitting beam reflected and/or dispersed by the environment with the aid of a second mirror in the same plane and to reflect it onto the light detector. In order to ensure a transmission and reception of the transmitting light beam or the receiving light beam in the predefined plane, the light source, the mirror system and the light detector may be placed in a housing, using corresponding fastening units for the respective components. The light source and the light detector may be permanently fixed in place inside the housing such that the light exit orifice of the light source and the light entry orifice of the light detector lie opposite each other and are situated on a common imaginary axis. In other words, such a system would cause a transmitting light beam emitted by the light source to directly impinge upon a detector surface of the light detector under a 90° angle if the mirror system were not situated between the light source and the light detector.

In addition, both the first mirror, the second mirror as well as an axis of rotation about which the second mirror is rotated are aligned at a right angle to the predefined plane. The predefined plane, for example, may correspond to a plane that is situated parallel to a surface (e.g., an underside) of the housing on which the light source and the light detector may be situated, using the already mentioned fastening units. An axis of rotation about which the mirror system is rotated may be positioned on the same surface of the housing as the fastening units for the light source and the light sensor, for which purpose a bearing is used that is introduced into a further fastening unit for that purpose. In addition, the axis of rotation of the mirror system may be positioned in the predefined plane such that the transmitting light beam essentially impinges in the center of the axis of rotation. In other words, the mirror system according to the afore-described system of the light source and light detector is situated in the middle of an optical path from the light source to the light detector.

Moreover, according to the present invention, the first mirror is likewise aligned at a right angle to the predefined plane and is situated in a region of the axis of rotation in a cutout of the second mirror in such a way that the first mirror and the second mirror rotate about this common axis of rotation. An angle under which the first mirror and the second mirror are disposed relative to each other about the common axis of rotation may correspond to an angle of 90°, but the angle is not restricted to such a value. In addition, it is conceivable that the angle assumes a random value of more than 0° to 90°. In the case of angles that have a value of less than 90°, in order to comply with the coaxial transmission and receiving of the transmitting light beam or the receiving light beam, a corresponding adaptation of the positioning of the light source and/or the light detector in the predefined plane is required to maintain the coaxial structure of the macro scanner system.

It should be noted that the first mirror need not necessarily be placed in a horizontal and/or vertical center of the second mirror. Instead, random positions are basically conceivable for integrating the first mirror into the second mirror, as long as the advantage of an optical isolation of the transmitting light beam from the receiving light beam according to the present invention is able to be ensured. For example, the first mirror is also able to be placed in a position at an outer edge region of the second mirror so that, for instance, only three sides of the second mirror surround the first mirror and it lies with one side towards the outer side of the mirror system. It should furthermore be pointed out that the first mirror and the second mirror may be made of different materials in order to influence the transmitting light beam and the receiving light beam in different manners, for instance, and/or in order to save production costs, as the case may be. It is also not absolutely necessary for a cutout of the second mirror into which the first mirror is integrated to be precisely adapted to a size and form of the first mirror (e.g., in an effort to simplify the production). Moreover, different fastening methods for fastening the first mirror to the second mirror are conceivable such as bonding or welding the two mirrors in the region of the common axis of rotation, and/or the use of a fastening device, which is introduced into the region of the axis of rotation at the cut surfaces between the first mirror and the second mirror and is clamped between the two mirrors, for example.

Both the first mirror and the second mirror may be made of glass provided with a single coating of silver, which allows the mirrors to be produced in a cost-effective manner. Moreover, the first mirror and the second mirror may also be configured as interference mirrors. In addition, the first mirror and the second mirror are able to have mirrored surfaces on one side or on both sides in each case. In other words, a mirror produced from silver-coated glass, for instance, is coated either only on one side of the glass or on both sides. The latter offers the advantage that after a rotation of 180° in the course of a continuous rotation about the axis of rotation, the mirror system is set up to directly reflect the transmitting light beam and the receiving light beam via the second mirror surface according to the present invention. When one-sided mirrors are used, the mirror system is able to reflect the transmitting light beam and the receiving light beam anew only after a rotation of 360° according to the present invention, which leads to corresponding interruption phases during the scanning of an environment and thus to a poorer time resolution in comparison with a mirror system provided with double-sided mirror surfaces. Because of the mirror placement according to the present invention, it is possible that only the receiving light beam is deflected to the light detector via the mirror surface of the second mirror. In other words, the light detector is unable to receive the transmitting light beam of the light source in a direct manner; instead, the light received by the light detector must always first be deflected into the environment and be dispersed and/or reflected by the environment in order to be received in the light detector. In this way, the optical isolation of the transmitting light beam from the receiving light beam is able to be ensured in the coaxial macro scanner system according to the present invention. The result may be an improved signal-to-noise ratio of the light signals received by the light detector so that, for example, a downstream object detection of an environment detection system is able to achieve better detection rates.

It should generally be pointed out that no further optical system that significantly affects the transmitting light beam and/or the receiving light beam need be situated between the mirror system and an exit surface of the macro scanner system because this may otherwise lead to undesired imaging errors on account of the rotation of the transmitting beam exiting from the system.

An activation of the light source (e.g., for the emission of pulsed laser light), a synchronization of the rotation of the mirror system with regard to a transmission instant of the transmitting light beam, and an evaluation of the receiving light beam received by the light detector are able to be carried out with the aid of an evaluation unit, which is situated in the housing, for example, and may be configured as an ASIC, FPGA, processor, digital signal processor, microcontroller or in a similar form and is able to be linked to an internal and/or external memory unit for signaling purposes.

Because the afore-described components of the coaxial macro scanner system according to the present invention are placed in a common predefined plane, the coaxial macro scanner system is able to be integrated into a housing having a flat configuration. The smallest possible configuration height of such a system is also realizable because it is possible to use light detectors, mirrors and beam-forming optical elements that have small dimensions (such as micromirrors and micro-lenses) due to the paraxiality of the system. The low configuration height is advantageous especially when the coaxial macro scanner system according to the present invention is integrated into an apparatus of transportation. The flat configuration form, for example, may allow the coaxial macro scanner system to be integrated into an intermediate space in the roof of the apparatus of transportation (e.g., between a roof liner and an external roof surface) instead of being placed on the roof, as it is done in the related art. A $c_d$ value (air drag coefficient) of such a apparatus of transportation is able to be improved in this way. In addition, having the option of integrating the coaxial macro scanner system according to the present invention into a vehicle roof and/or into other installation locations in an invisible or barely visible manner makes it possible to better implement certain configuration requirements imposed by such an apparatus of transportation.

Moreover, it may also be the case that an alignment of a component or a plurality of components of the coaxial macro scanner system according to the present invention does not necessarily correspond to a perpendicular alignment in relation to the predefined plane. Depending on an adaptation of the coaxial macro scanner system to a specific application purpose, it is also conceivable that the alignment of a component or a plurality of components of the coaxial macro scanner system corresponds only approximately to a perpendicular alignment relative to the predefined plane.

In addition, the mirror system and/or the axis of rotation of the coaxial macro scanner system is/are able to be set into a rotation with the aid of different drives such as an electric motor, in order to carry out scanning of an environment. Moreover, the mirror system according to the present invention may also be used in an optical system without a rotating scanning mechanism; in this case, a fixed axis may be used instead of an axis of rotation, on which the mirror system may be positioned in a similar manner as described above. This makes it possible to exploit the advantage of the optical isolation of the transmitting light beam from the receiving light beam also for a distance measurement that is directed to a single point, for example.

The further descriptions describe further developments of the present invention.

In one advantageous further development of the present invention, the coaxial macro scanner system also includes a first optical element for beam forming, which is situated in the optical path between the light source and the rotatable mirror system, and/or a second optical element for beam forming, which is situated in the optical path between the rotatable mirror system and the light detector. For example, the first optical element and/or the second optical element may be made up of cylindrical lenses, symmetrical lenses or a lens system that could also include micro lenses in each case. The first optical element and the second optical element may also be fastened to a surface of the housing with the aid of a fastening unit.

If the coaxial macro scanner system uses a line-shaped scanning beam, for instance, the laser beam emitted with the aid of the laser source may be formed in an axis that corresponds to a narrow side of the line such that it has a correspondingly low divergence (measure of an opening angle of an optical path). A collimation (a parallel alignment of divergent light beams) of the laser beam is particularly advantageous in this context. The divergence of the laser beam depends on a beam diameter and a beam quality of the laser beam. In case of a further axis that extends perpendicular to the axis, on the other hand, the laser beam may have a relatively large divergence so that a corresponding line form of the laser beam for the scanning of the environment results at a certain distance from the coaxial macro scanner system. Via the second optical element, the receiving light beam is able to be focused so that it is optimally adapted to a detection surface of the light detector.

If a punctiform laser beam is used for scanning the environment, then the first optical element is able to correspondingly collimate the laser beam in both axes.

In another advantageous further development of the present invention, a size and a form of the first mirror may essentially correspond to a size and a form of the transmitting light beam impinging upon the first mirror. This offers the advantage that the surface of the first mirror is able to be restricted to a minimum size. Since the first mirror is integrated into a cutout of the second mirror under a predefined angle, a size of the first mirror thus has a direct influence on the available remaining surface of the second mirror. In other words, the smaller the surface of the first mirror, the smaller the cutout of the second mirror adapted to the first mirror may be. In this way, a size and form of the first mirror adapted to the transmitting light beam make it possible for the transmitting light beam to be deflected into the environment in a more or less completely loss-free or loss-free manner by way of the first mirror. A first mirror potentially selected to have a larger size (i.e. larger than required for a size and form of a transmitting light beam) thus provides no advantage with regard to a deflection of the transmitting light beam by the first mirror. At the same time, because of the coaxial system, it is advantageous if the second mirror is able to deflect the divergent receiving beam, reflected and/or dispersed by the environment, to the light detector via the largest possible surface of the second mirror. In order to once again ensure a deflection of the receiving light beam onto the light deflector with minimal losses, if possible, a size and a form of the second mirror may likewise be adapted to a size and a form of the receiving light beam when it impinges upon the second mirror. Because of the greater divergence of the receiving light beam in comparison with the divergence of the transmitting light beam (viewed at a position of the mirror system in each case), the second mirror requires a correspondingly larger surface for a more or less loss-free deflection of the receiving light beam from the environment onto the light detector. Since a random enlargement of the surface of the second mirror beyond the size of the receiving beam does not offer any advantage with regard to the deflection of the receiving light beam, the smallest possible cutout in the second mirror for the placement of the first mirror is desirable so that the largest possible receiving area may be made available. Basically, a more or less complete deflection of the transmitting light beam and a more or less complete deflection of the receiving light beam is to be aimed for by the selection of the respective mirror sizes and forms so that the largest possible light intensity of the emitted laser light is able to be received at the light detector. The form of the transmitting light beam may be round, rectangular or elliptical, for example, but it is not restricted to the mentioned forms.

In addition, the surface of the second mirror may correspond to twice the surface, in particular to four times the surface, and particularly to eight times the surface of the first mirror. However, any other size proportions between the first mirror and the second mirror are selectable, as long as the advantages of the present invention are retained and the first mirror is able to be suitably integrated into the second mirror.

In another advantageous further development of the present invention, the second mirror may have a plurality of cutouts into which a plurality of first mirrors is inserted in the region of the common axis of rotation. In a first variant of a lateral placement of the plurality of first mirrors, the mirrors are able to be positioned under different angles from one another (which may be with a small deviation). In this way, a field of view of the coaxial macro scanner system may either be subdivided into a plurality of regions, which allows for a parallelization resulting in a higher frame rate, or it is able to be expanded accordingly. In a second variant of a lateral placement of the plurality of first mirrors, the first mirrors may be positioned under essentially identical angles with respect to one another. This makes it possible to subdivide the field of view of the coaxial macro scanner system into different regions. In addition, all first mirrors are able to be aligned in such a way that only one line in the field of view of the coaxial macro scanner system is addressed. This provides an advantage with regard to eye safety and/or a greater range of the sensor. In the case of a vertical placement of the plurality of first mirrors, they may subdivide the field of view into a plurality of regions in such a way that the individual scanning beams overlap only in a far field of the coaxial macro scanner system, which once again may provide advantages with regard to eye safety and/or the greatest possible increase in an output power for the purpose of achieving a greater range of the coaxial macro scanner system.

At the same time, a plurality of light sources may be positioned in such a way that their transmitting light beams impinge upon one of the plurality of first mirrors parallel to the predefined plane in each case. As an alternative to the mentioned cutouts within the surface of the second mirror, the second mirror may also be made up of a plurality of strip-shaped mirrors which are situated at a predefined distance from one another along the axis of rotation. A plurality of individual first mirrors may once again be placed into the respective intermediate spaces between the plurality of second mirrors on the common axis of rotation, which may essentially correspond to the gap sizes of the second mirror.

In another advantageous further development of the present invention, the light source may be made up of a plurality of individual light sources (e.g., laser bars), the light sources being positioned in such a way that their respective transmitting beams adjoin or overlap one another when impinging upon the first mirror. For example, this makes it possible to achieve a line-shaped scanning beam by concatenating the individual light sources in an axis of the thereby produced scanning beam. When a plurality of individual light sources is used, then a transmission power of the coaxial macro scanner system, and thus a detection power of the system resulting therefrom, is able to be increased. In addition, the malfunction of individual light sources in such a system does not lead to gaps in the detection range but simply to a reduction in a maximum range of the coaxial macro scanner system.

In another advantageous further development of the present invention, the first mirror and/or the second mirror may have a curvature in order to compensate for optical defects in the optical transmission and/or receiving path, for example. The first and/or the second mirror, for instance, may have a parabolic, a hyperbolic, or a spherical form or also a form that deviates therefrom.

In the following text, exemplary embodiments of the present invention are described in detail with reference to the appended drawing.

DETAILED DESCRIPTION

Figure 1:
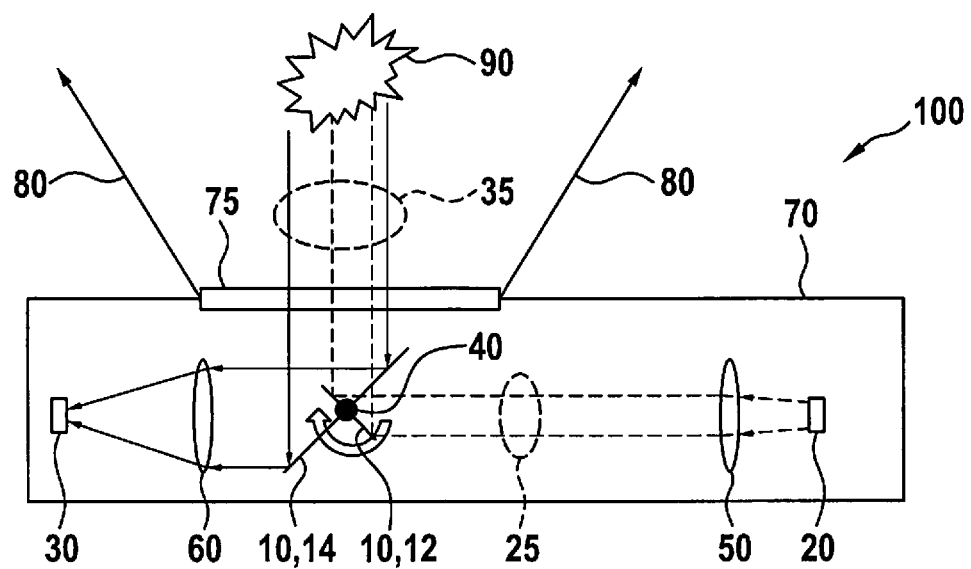
FIG. 1 shows a schematic plan view of a coaxial LIDAR macro scanner system according to the present invention.

FIG. 1 shows a schematic plan view of a coaxial LIDAR macro scanner system 100 according to the present invention, which is integrated into a housing 70. Housing 70 has a light exit area 75 via which laser light generated by coaxial LIDAR macro scanner system 100 for scanning an environment 90 is able to enter and exit. Coaxial LIDAR macro scanner system 100 includes a laser source 20 for generating a transmitting light beam 25, which passes through a first lens system 50 configured to collimate transmitting light beam 25 in one axis so that transmitting light beam 25 has a linear form when it impinges upon an object in environment 90 of coaxial LIDAR macro scanner system 100. Next, transmitting light beam 25 impinges upon a first mirror 12 of a mirror system 10 which is rotatably supported in a housing 70 via an axis of rotation 40, and is emitted from housing 70 through light exit area 75 via first mirror 12. When mirror system 10 is rotated, transmitting light beam 25 sweeps environment 90 in the region of a field of view 80 of coaxial LIDAR macro scanner system 100. Transmitting light beam 25, reflected and/or dispersed by environment 90, reenters coaxial LIDAR macro scanner system 100 through light exit area 75 in the form of a receiving light beam 35. There, it is received by a second mirror 14, which is situated on axis of rotation 40 under an angle of 90° relative to first mirror 12, and is reflected to a light detector 30. A second lens system 60 for focusing or imaging receiving light beam 35 onto a detection surface of light detector 30 is situated between second mirror 14 and light detector 30. Light source 20, first lens system 50, mirror system 10, second lens system 60, and light detector 30 are situated along a common horizontal line in the plan view and in a common predefined plane with regard to a depth placement.

Figure 2:
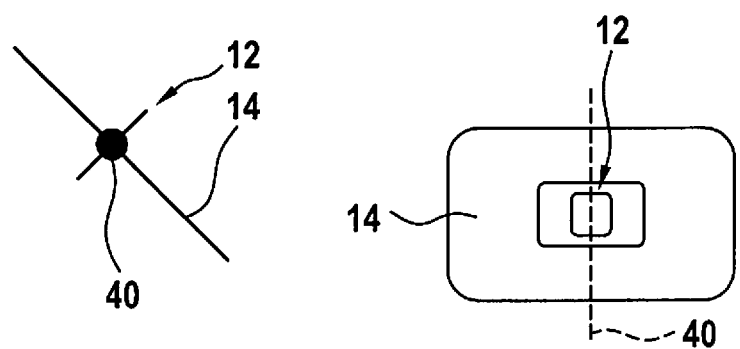
FIG. 2 shows a schematic plan view and a schematic side view of a mirror system according to the present invention in a first specific embodiment.

FIG. 2 shows a schematic plan view (left portion of the figure) and a schematic side view (right portion of the figure) of a mirror system 10 according to the present invention in a first specific embodiment. Mirror system 10 includes a first mirror 12 and a second mirror 14, which are configured in an essentially rectangular form. In addition, both mirrors 12, 14 are disposed along a common axis of rotation 40 under an angle of 90° relative to each other. Second mirror 14 has a cutout in which first mirror 12 is fixed in place along axis of rotation 40.

Figure 3:
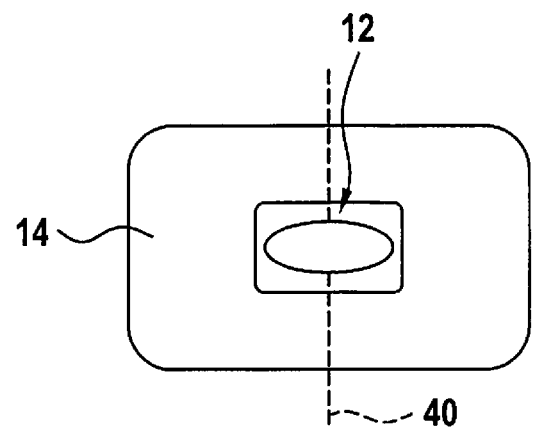
FIG. 3 shows a schematic side view of a mirror system according to the present invention in a second specific embodiment.

FIG. 3 shows a schematic side view of a mirror system 10 according to the present invention in a second specific embodiment. Mirror system 10 includes a first mirror 12, which has an elliptical form, and a second mirror 14, which has an essentially rectangular development. Moreover, the two mirrors 12, 14 are situated along a common axis of rotation 40 under an angle of 90° relative to each other. Second mirror 14 has a cutout in which first mirror 12 is fixed in place along axis of rotation 40.

Figure 4:
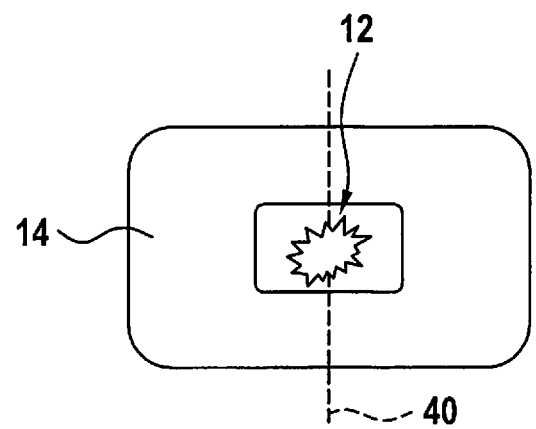
FIG. 4 shows a schematic side view of a mirror system according to the present invention in a third specific embodiment.

FIG. 4 shows a schematic side view of a mirror system 10 according to the present invention in a third specific embodiment. Mirror system 10 includes a first mirror 12, which has a free form, and a second mirror 14, which has an essentially rectangular development. In addition, the two mirrors 12, 14 are situated along a common axis of rotation 40 under an angle of 90° relative to each other. Second mirror 14 has a cutout in which first mirror 12 is fixed in place along axis of rotation 40.

What is claimed is:

1. A coaxial macro scanner system, comprising:
   a light source;
   a light detector; and
   a rotatable mirror system for the optical isolation of an optical path between the light source and the light detector;
   wherein the rotatable mirror system is configured to emit a transmitting light beam, generated by the light source, with a first mirror in a predefined plane into an environment, and to receive a receiving light beam, which represents components of the transmitting light beam reflected and/or dispersed by the environment, with a second mirror in the same plane and to reflect it onto the light detector,
   wherein both the first mirror, the second mirror and an axis of rotation about which the second mirror is rotated being aligned at a right angle to the predefined plane,
   wherein the first mirror is aligned at a right angle to the predefined plane and situated in a region of the axis of rotation in a cutout of the second mirror so that the first mirror and the second mirror rotate about the common axis of rotation, and wherein an angle under which the first mirror and the second mirror are disposed relative to each other about a common axis of rotation corresponds to an angle of more than 0°.

2. The coaxial macro scanner system of claim 1, further comprising:
a housing in which the light source, the rotatable mirror system and the light detector are disposed.

3. The coaxial macro scanner system of claim 1, wherein the light source is a laser.

4. The coaxial macro scanner system of claim 1, wherein the angle between the first mirror and the second mirror lies in a range of 10° to 90°, and wherein the light source and the light detector are situated on opposite sides of the rotatable mirror system in each case.

5. The coaxial macro scanner system of claim 1, further comprising:
a first optical element for beam forming, which is situated in the optical path between the light source and the rotatable mirror system, and/or a second optical element for beam forming, which is situated in the optical path between the rotatable mirror system and the light detector.

6. The coaxial macro scanner system of claim 5, wherein the transmitting light beam is collimated in one axis or in two axes with the first optical element.

7. The coaxial macro scanner system of claim 1, wherein a size and a form of the first mirror essentially corresponds to a size and a form of the transmitting light beam impinging upon the first mirror, and/or wherein a surface of the second mirror corresponds to twice the surface, and
wherein the form of the transmitting light beam in particular is round, rectangular, or elliptical.

8. The coaxial macro scanner system of claim 1, wherein the second mirror has a plurality of cutouts in which a plurality of first mirrors is inserted in the region of the common axis of rotation, and wherein a plurality of light sources is situated so that their respective transmitting light beams impinge upon one of the plurality of first mirrors parallel to the predefined plane in each case.

9. The coaxial macro scanner system of claim 1, wherein the light source includes a plurality of individual light sources, which are positioned so that their respective transmitting light beams adjoin or overlap one another when impinging upon the first mirror.

10. The coaxial macro scanner system of claim 1, wherein the first mirror and/or the second mirror has a curvature.

11. The coaxial macro scanner system of claim 1, wherein the light source is a laser for a LIDAR system.

12. The coaxial macro scanner system of claim 1, wherein the angle between the first mirror and the second mirror lies in a range of 40° to 90°, and wherein the light source and the light detector are furthermore situated on opposite sides of the rotatable mirror system in each case.

13. The coaxial macro scanner system of claim 1, wherein the angle between the first mirror and the second mirror lies in a range of 80° to 90°, and wherein the light source and the light detector are furthermore situated on opposite sides of the rotatable mirror system in each case.

14. The coaxial macro scanner system of claim 1, wherein a size and a form of the first mirror essentially corresponds to a size and a form of the transmitting light beam impinging upon the first mirror, and/or wherein a surface of the second mirror corresponds to four times the surface, and
wherein the form of the transmitting light beam in particular is round, rectangular, or elliptical.

15. The coaxial macro scanner system of claim 1, wherein a size and a form of the first mirror essentially corresponds to a size and a form of the transmitting light beam impinging upon the first mirror, and/or wherein a surface of the second mirror corresponds to eight times the surface of the first mirror, and
wherein the form of the transmitting light beam in particular is round, rectangular, or elliptical.

* * * * *